(12) United States Patent
Erickson et al.

(10) Patent No.: US 9,514,495 B2
(45) Date of Patent: Dec. 6, 2016

(54) CREATION AND USE OF CLOSELY-MATCHED GROUPS TO AID IN INITIATING AND SUSTAINING BEHAVIORAL CHANGE

(71) Applicant: International Business Machines Corporation, Armonk, NY (US)

(72) Inventors: Thomas Erickson, Minneapolis, MN (US); Robert G. Farrell, Cornwall, NY (US); Wendy A. Kellogg, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 14/024,678

(22) Filed: Sep. 12, 2013

(65) Prior Publication Data

US 2015/0074109 A1    Mar. 12, 2015

(51) Int. Cl.
*G06F 17/30*        (2006.01)
*G06Q 50/00*        (2012.01)

(52) U.S. Cl.
CPC ......... *G06Q 50/01* (2013.01); *G06F 17/30598* (2013.01)

(58) Field of Classification Search
CPC ................................................. G06F 17/30598
See application file for complete search history.

(56) References Cited

U.S. PATENT DOCUMENTS 8,930,204 B1 * 1/2015 Igoe .......................... G06F 9/00
                                                            705/2
2007/0072156 A1    3/2007 Kaufman et al.
2009/0254971 A1 * 10/2009 Herz .................... G06Q 10/10
                                                              726/1
2009/0319288 A1 * 12/2009 Slaney ................. G06Q 30/02
                                                            705/1.1
2010/0205541 A1 *  8/2010 Rapaport ............ G06Q 10/10
                                                           715/753

(Continued)

FOREIGN PATENT DOCUMENTS

WO    2010141251 A2    12/2010
WO    2012050882 A1     4/2012

OTHER PUBLICATIONS

Mirkes, "K-means and K-medoids applet", University of Leicester, 2011, pp. 1-4, http://www.math.le.ac.uk/people/ag153/homepage/KmeansKmedoids/Kmeans_Kmedoids.html#L2.

(Continued)

*Primary Examiner* — Mohammad S Rostami
(74) *Attorney, Agent, or Firm* — Michael A. Petrocelli (57) ABSTRACT

A method and system for sharing data between a plurality of users in an online group on a communications system includes receiving data from a plurality of users. The data includes personal characteristics about the users. The personal characteristics are analyzed to determine groups of personal characteristics. The users are clustered into closely matched groups based on the groups of personal characteristics. A plurality of activity information is generated about the users in each of the closely matched groups. The activity information may include a physical activity, a location, and a time of day. User may be allowed access to the activity information about other users in each of the closely matched groups, respectively.

9 Claims, 9 Drawing Sheets

(56) References Cited

U.S. PATENT DOCUMENTS

| | | | |
|---|---|---|---|
| 2010/0235776 A1 | 9/2010 | Brown | |
| 2011/0093295 A1* | 4/2011 | Mankad | G06Q 10/10 705/3 |
| 2011/0281249 A1* | 11/2011 | Gammell | A63B 24/0075 434/247 |
| 2012/0117479 A1 | 5/2012 | Kembel et al. | |
| 2012/0197986 A1* | 8/2012 | Chen | G06Q 30/00 709/204 |
| 2013/0095458 A1* | 4/2013 | Cha | G06F 19/3481 434/247 |
| 2013/0198214 A1* | 8/2013 | Hall | G06F 17/30386 707/758 |
| 2014/0081667 A1* | 3/2014 | Joao | G06F 19/322 705/3 |
| 2014/0244622 A1* | 8/2014 | Lindsay | G06F 17/30554 707/722 |
| 2014/0278308 A1* | 9/2014 | Liu | H04L 67/22 703/6 |
| 2015/0088624 A1* | 3/2015 | Frederick | G06Q 20/3224 705/14.12 |

OTHER PUBLICATIONS

Hauser et al, "The Learning Region: Impact of Social Capital and Weak Ties on Innovation", Regional Sudies, Manuscript ID: Cres-2005-0153.R1, vol. 41, Issue 1, pp. 1-33, 2007, http://mc.manuscriptcentral.com/cres.

O'Neill et al, "Commit to Making a Change"; "Control Your Destiny"; "Expect Obstacles and Prepare for Relapses"; "Get Help and Be Accountable"; "Kick It Up a Notch"; "Make Progress Every Day"; "Monitor Your Progress and Reward Success"; "Put Your Mind to It"; "Say "No" to Super-Sizing"; "Set a Date and Get Started . . .Just Do It!"; and "Step Down to Change", 44 pages, https://www.extensioniastate.edu/NR/rdonlyres/EEB15598-643C-4398-AAF0-351401434E6C/111748/session4handouts.pdf.

Glasgow et al, "Interactive Behavior Change Technology a Partial Solution to the Competing Demands of Primary Care", American Journal of Preventive Medicine, 2004, pp. 80-87.

Oinas-Kukkonen, "Behavior Change Support Systems: The Next Frontier for Web Science," Web Science Conf., Apr. 26-27, 2010, 8 pages.

Lau et al, "Social Features in Online Communities for Healthcare Consumers—A Review," A.A. Ozok and P. Zaphiris (Eds): Online Communities, LNCS 5261, pp. 682-689, 2009.

* cited by examiner

| 600 → | 602 ↓ | 604 ↓ | 606 ↓ | 608 ↓ | 610 ↓ |

| Group/ Characteristic | Age = young | Age = old | Gender = male | Gender = female |
|---|---|---|---|---|
| 1 | 1 | 0 | 0 | 1 |
| 2 | 0 | 1 | 1 | 0 |

FIG. 10

| 700 → | 702 ↓ | 704 ↓ | 706 ↓ | 708 ↓ |

| User/ Data | Data for target aspect | Location | Amount of Time (hrs) |
|---|---|---|---|
| 1 | jogging | track | 1 |
| 2 | sitting | park | 1 |
| 3 | swimming | river | 2 |
| 3 | jogging | park | 1 |
| 4 | jogging | park | 3 |
| 4 | eating | home | 1 |

FIG. 11

| User/User | User 1 old male, in Group 2 | User 2 young female in Group 1 | User 3, young female in Group 1 | User 4, young female in Group 1 |
|---|---|---|---|---|
| 1 | - | - | - | - |
| 2 | - | - | Sitting at the park for an hour | Sitting at the park for an hour |
| 3 | - | Swimming at the river for 2 hours, Jogging at the park for 1 hour | - | Swimming at the river for 2 hours, Jogging at the park for 1 hour |
| 4 | - | jogging at the park for 3 hours | jogging at the park for 3 hours | - |

CREATION AND USE OF CLOSELY-MATCHED GROUPS TO AID IN INITIATING AND SUSTAINING BEHAVIORAL CHANGE

BACKGROUND

1. Field

The present disclosure relates to a method and system for sharing data between a plurality of users in an online group on a communications system for initiating and sustaining behavioral changes of the users.

2. Background of the Disclosure

Many societal problems can be addressed, in part, by encouraging individuals to change their everyday behavior. Such societal problems may include over-consumption of resources, pollution and congestion caused by auto traffic and the increasing costs associated with addressing lifestyle-related health problems such as obesity, type 2 diabetes, and heart disease. One approach to enabling behavior change is to form online communities or groups that enable people with similar goals or conditions to interact with one another. The online community can be implemented using various known communications systems and venues, such as a website, blog, or posting using the Internet. In such online communities interactions can include jointly committing to goals, sharing experiences, sharing activities and achievements, engaging in contests and competitions, providing advice, and offering emotional support.

A drawback, for example, to the above discussed communities is that people differ greatly in their personal characteristics. For instance, in a group of people committed to losing weight, a person who is 10 pounds over their ideal weight has a different situation from a person who is 150 pounds over their ideal weight. In another example, one person may be a single parent with a limited income and a 12 hour a day job leaving them with limited time and resources, and another person may be an upper middle class retired executive who has ample time and resources to address a problem and implement a solution. Such differences in people's personal characteristics, e.g., environment, life style, time demands, can result in advice proffered to one person, having little relevance to another person. Similarly, because individuals most readily form social bonds with others who they see as like themselves, such differences may also result in individuals feeling that they have little in common with the others in a group, reducing the possibility of the people in the group providing mutual emotional support. For both of these reasons, a person or a group of people in an online community are less likely to initiate and sustain positive behavioral change.

BRIEF SUMMARY

There is a need for a method and system of composing groups of people for online communication who have similar personal characteristics. For example, it would be desirable to provide a method and system for users to form an online support group wherein the users have similar characteristics, for example, losing weight, encouraging exercise, encouraging healthy eating habits, etc., to change their behavior as well as others in the group pertaining to the established goal of the group, wherein similar personal characteristics are also including in determining the participants in the group.

According to an aspect of the invention, a method for sharing data between a plurality of users in an online group on a communications system includes receiving data from a plurality of users communicating on a communications system. The data includes personal characteristics about the users. The method includes analyzing the personal characteristics to determine a plurality of groups of personal characteristics. The users are clustered into closely matched groups respective to the groups of personal characteristics. The method generates a plurality of activity information about each of the users in the closely matched groups, respectively. The activity information includes a physical activity. The method allows access to the users in each of the closely matched groups to the activity information about other users in each of the closely matched groups, respectively. At least one of the above steps is performed using a program executable by a processor of a computer.

According to another aspect of the invention, a computer program product for sharing data between a plurality of users in an online group on a communications system includes a computer readable storage medium having program code embodied therewith. The program code is readable/executable by a processor to perform a method, which includes the steps of: receiving data from a plurality of users communicating on a communications system, the data including personal characteristics about the users; analyzing the personal characteristics to determine a plurality of groups of personal characteristics; clustering the users into closely matched groups respective to the groups of personal characteristics; generating a plurality of activity information about each of the users in the closely matched groups, respectively, the activity information including a physical activity, a location, and a time of day; and allowing access to the users in each of the closely matched groups to the activity information about other users in each of the closely matched groups, respectively, wherein at least one of the above steps is performed using a program executable by a processor of a computer.

According to another aspect of the invention, a system for sharing data between a plurality of users in an online group on a communications system includes a computer system having a communication tool configured to receive data from a plurality of users communicating on a communications system. The data includes personal characteristics about the users. An analysis module of a computer program of the computer system is configured to analyze the personal characteristics to determine a plurality of groups of personal characteristics. The computer system is configured to clusters the users into closely matched groups respective to the groups of personal characteristics. An analysis tool of the computer program is configured to generate a plurality of activity information about each of the users in the closely matched groups, respectively. The activity information includes a physical activity. The communications tool further is configured to allow access to the users in each of the closely matched groups to the activity information about other users in each of the closely matched groups, respectively, and at least one of the above steps is performed using a program executable by a processor of a computer.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
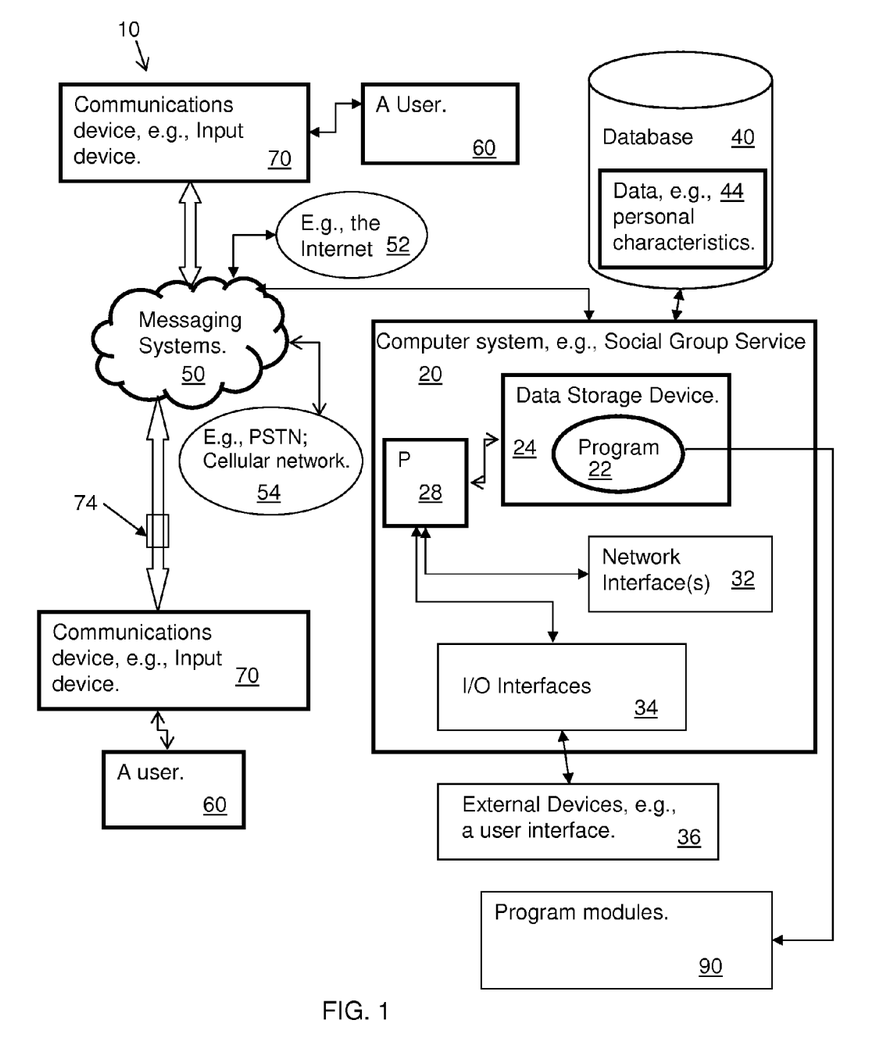
FIG. 1 is a schematic block diagram illustrating an overview of the system and methodology for sharing data between a plurality of users in an online group on a communications system according to an embodiment of the disclosure.
Figure 2:
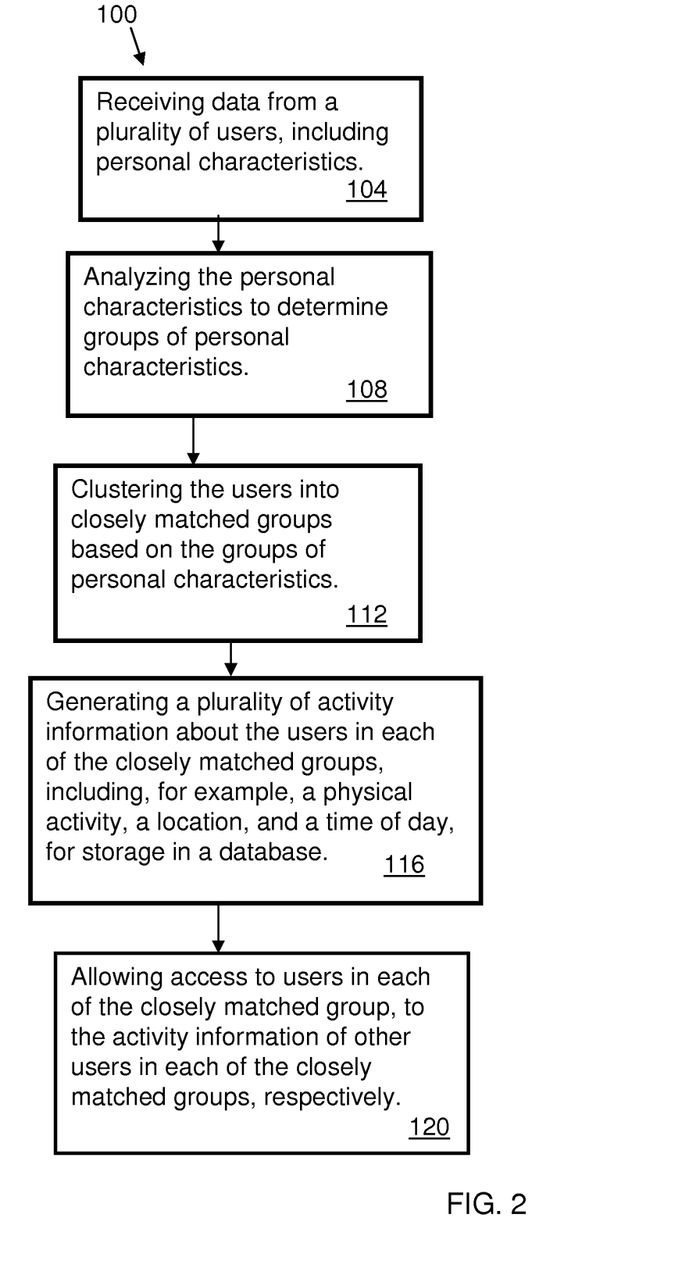
FIG. 2 is a flow chart illustrating a method for sharing data between a plurality of users in an online group on a communications system using the system shown in the block diagram of FIG. 1, according to an embodiment of the disclosure.

A system 10 and method 100 according to an embodiment of the invention, for sharing data between a plurality of users in an online group on a communications system is depicted in FIGS. 1 and 2. The system 10 and method 100 includes a plurality of users 60 having access to communication devices 70. The users 60 and respective communication devices 70 are shown for illustrative purposes. For example, a group of users may include, two, ten, or dozens of users, or even hundreds of users. The communication devices 70 may include an input device, that is, a computer, or Personal Data Assistant (PDA), cell phone, notebook, or the like, where personal characteristic data can be inputted and sent to a receiving system, as embodied herein, a computer system 20, as described in more detail below. The communication devices may also include sensors which detect a personal characteristic of the user and send the data to the receiving system.

Referring to FIG. 2, a method 100 includes receiving data from the plurality of users 60, in step 104. The data can include personal characteristics 44, which can be stored in a database 40 as shown in FIG. 1. The method can be implemented using the system 10 of FIG. 1. The data is generically represented by message 74 shown in FIG. 1. The message 74 can be sent using a Personal Data Assistant (PDA) which uses a communications system, e.g., messaging system 50 which can include the Internet 52 or a public switched telephone network (PSTN) for example, a cellular network 54. The PSTN may include telephone lines, fiber optic cables, microwave transmission links, cellular networks, and communications satellites. Exemplary messaging services may include Short Message Service (SMS) which is a text messaging service component of phone, web, or mobile communication systems, using standardized communications protocols which allows the exchange of short text messages between fixed line or mobile phone devices. The Internet may facilitate numerous texting techniques, for example, using a cell phone or laptop computer to send text messages via Multimedia Messaging Service (MMS) (related to SMS) as one way to send messages that include multimedia content to and from mobile phones, or to and from one or more email accounts via the Internet.

The data 74 sent by the users 60 includes personal characteristics 44 which may be stored in a database 40 of a computer system 20. The computer system can be part of a social group service for providing the method disclosed herein as a service. The method 100 may be embodied in a program 22 embodied on a computer readable storage medium, e.g., a data storage device 24, and the program 22 is executable by a processor 28 of the computer 20 (i.e., execute program steps, code, or program code). The program or executable instructions therefrom, may be offered as a service by a provider. The program may also be stored and run locally on a user device. The computer 20 and program 22 shown in FIG. 1 are generic representations of a computer and program that may be local, on a personal data assistant, or part of one or more servers. The computer system 20 can include a network interface 32, and input/output (I/O) interface(s) 34. The I/O interface 34 allows for input and output of data with an external device 36 that may be connected to the computing device. The network interface 32 may provide communications between the computing device and a computer network.

The program 22 may include program modules 90 for executing specific steps, routines, sub-routines, instructions or code, of the program. Such modules 90 are generically represented in FIG. 1, and are discussed in more detail below.

The personal characteristics (also referred to as personal characteristic data) can also be detected using one or more sensors as an embodiment of an input device 70, generically shown in FIG. 1. Sensors may include any device which can automatically detect the personal characteristic data of a user, such as, for example, a heart rate sensor, a pulse sensor, a pedometer. The personal characteristic data may include time and location stamps.

The input devices may utilize modes of communication or communication threads, which may include emails, messaging (e.g., electronic messaging) which can include data, text, or electronic content. Example embodiments of input devices can include any device capable of electronically communicating between devices, for example: a laptop, a notebook, a cell phone, a netbook, a tablet, a personal data assistant (PDA), or a car communication system. The input devices may include sensors (discussed above). The input devices are collectively represented as input devices 70 shown in FIG. 1.

The personal characteristics can include user demographics, which may include a user's: interests, occupation, marital status, or age. The personal characteristics may also include one or more goals defined by a user, wherein the goals include one or more patterns of human activity. For example, a pattern of human activity may include a repeated physical activity. Personal characteristics can include a number of human dimensions such as physical activity, personal interests, personality profile, life style, education level; educational and experience areas or fields.

Step 108 includes analyzing the personal characteristics to determine groups of personal characteristics. The analysis can be performed by the program 22 which searches the collected personal characteristics to match to an exiting group list, or detects similar personal characteristics and suggests groups based on multiple incidences of personal characteristics. Step 112 includes clustering the users into closely matched groups based on the groups of personal characteristics. For example, the a group can be defined as all users who have a specified personal characteristic, such as, a desire to lose 25 pounds or more, or attending a gym three times a week or more.

Step 116 of method 100 includes, generating a plurality of activity information about the users in each of the closely matched groups. The activity information, for example, includes a physical activity, a location, and a time of day.

Step 120 includes allowing access to users in each of the closely matched groups to the activity information about other users in each of the closely matched groups, respectively. The users can view the activity information using, for example, a PDA, computer, or cell phone, as discussed above generically represent in FIG. 1 as an input device 80, in step 124.

The above method of the present disclosure can be implemented as a service, wherein users can register with the service, and supply information, that is, the personal characteristics. In this embodiment, the personal characteristics would be supplied by the users and the steps above for the method 100 would be implemented as a service rather than, for example using a locally saved application.

In another alternative the plurality of activity information may include a first type of information and a second type of information, or a combination of the first and second types of information, as selected by a user. The first and second types of information (or multiple types of information) can include times of activities, and places of activity, respectively.

In another instance, a social affinity between the users may be computed based on a commonality of the personal characteristics, and user availability. A social affinity may include a probability of users finding each other compatible. Compatibility can be determined by calculating common personal characteristics, and user availability to share information.

The method 100 may also include generating a projected success rate of a behavioral change for each of the closely matched groups and the users in the respective groups, based on an analysis of the activity information. The activity information can be analyzed to determine the probability of success, or a projected success rate, for a behavioral change. The method disclosed herein may also generate a suggested activity change to achieve a behavioral change for a closely matched group and the users of the closely matched group based on an analysis of the activity information.

The method 100 and system 10 of the present disclosure provides for generating groups of people for online communication who have similar personal characteristics, for example, users communicating in an online support group wherein the users have similar characteristics such as, for example, losing weight, encouraging exercise, encouraging healthy eating habits, etc. The method 100 and system 10 of the present disclosure encourages the desired change of the group members' behavior pertaining to the established goal of the group.

The above described method 100 can be implemented as a computer program product for sharing data between a plurality of users 60 in an online group on a communications system 50. The computer program product can include a computer readable storage medium 24 having program code 22 embodied therewith, the program code 22 is readable/executable by a processor 28 to perform the method 100.

Thereby, the system 10 and method 100 shown in FIGS. 1 and 2 and described above, provide a system and method for sharing data between a plurality of users in an online group on a communications system 50. The system includes the plurality of communication devices, e.g., input devices 80, each configured to receive a data input about the plurality of users 60, respectively. The data inputs from the input devices 80 include the personal characteristics 44 about each of the users 60, and the communication devices are configured to send the data inputs 74. The computer system 20 is configured to receive the data inputs 74 from the communication devices of the plurality of users 60. As discussed heretofore, the computer system 20 includes the program 22 embodied on the computer readable storage medium, the data storage device 24, and the program is executable by the processor 28 of the computer. The program 22 including code to analyze the personal characteristics 44 about each of the users 60 to determine groups of personal characteristics. The program includes code to cluster the users into closely matched groups based on the groups of personal characteristics. The program further includes code to generate activity information about the users in each of the closely matched groups, wherein the activity information can include a physical activity, a location, and a time of day. The user interface 80 can be configured to allow access to the activity information about the users in each of the closely matched groups by the users in the respective closely matched group.

Figure 3:
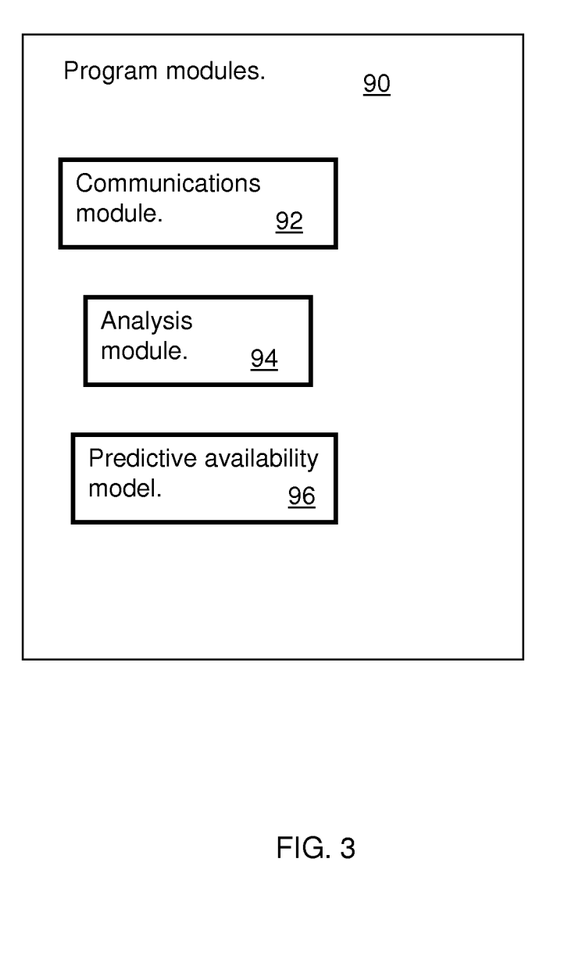
FIG. 3 is a detailed block diagram of the program modules shown in FIG. 1.

Referring to FIGS. 1 and 3, in one embodiment of a system for sharing data between a plurality of users in an online group on a communications system, includes the computer system 20 shown in FIG. 1 and program modules 90 depicted in FIG. 3. The computer system includes a communications tool embodied as a communications module 92 of the program 22. The communications module 92 is configured to receive data from a plurality of users communicating on a communications system. The data includes personal characteristics about the users. An analysis module 94 of the computer program 22 is configured to analyze the personal characteristics to determine a plurality of groups of personal characteristics. The computer system is configured to cluster the users into closely matched groups respective to the groups of personal characteristics. An analysis tool embodied as an analysis module 96 of the computer program 22 which is configured to generate a plurality of activity information about each of the users in the closely matched groups, respectively, wherein the activity information can include a physical activity, a location, and a time of day. The communications module 92 is further configured to allow access to the users in each of the closely matched groups to the activity information about other users in each of the closely matched groups, respectively.

Figure 4:
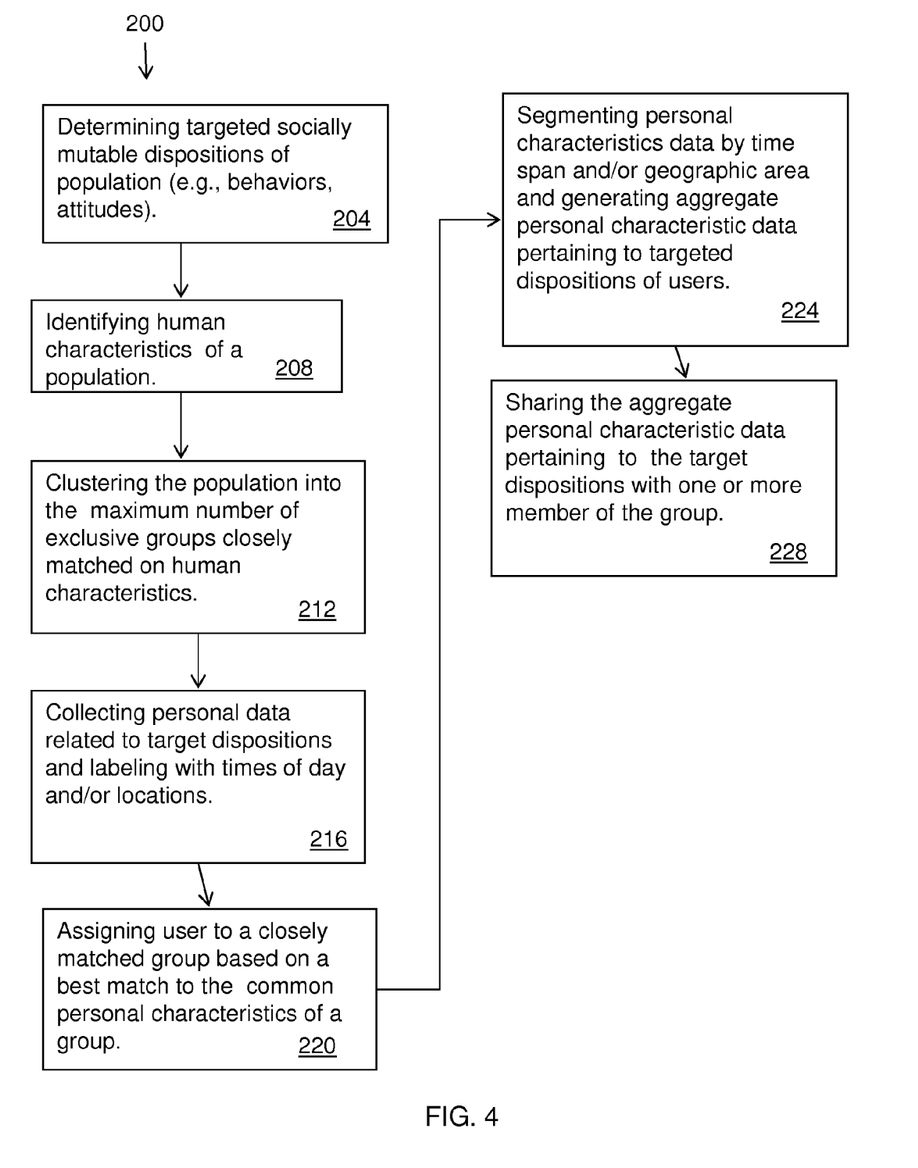
FIG. 4 is a flow chart depicting a method according to another embodiment of the disclosure.
Figure 5:
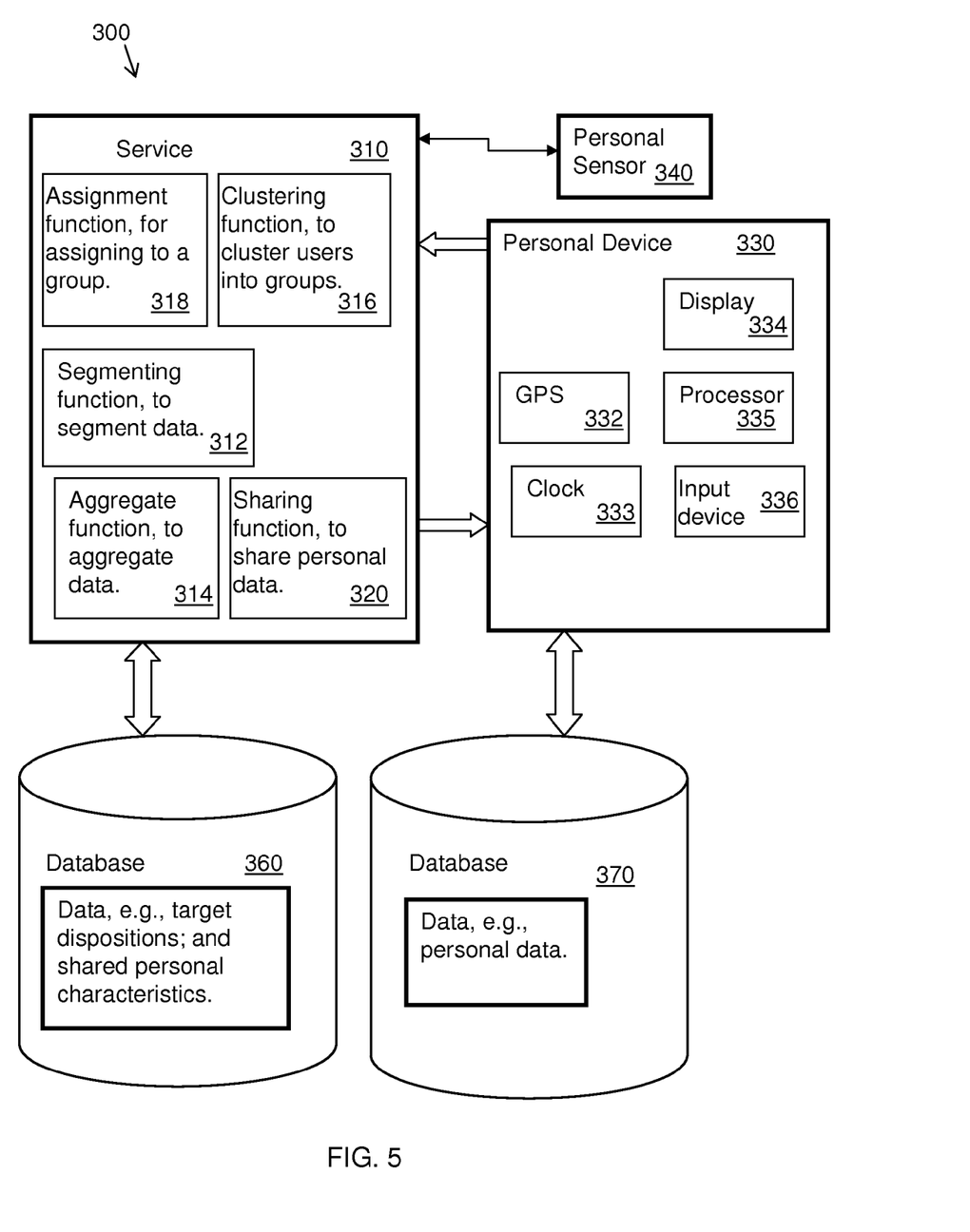
FIG. 5 is a schematic block diagram illustrating an overview of the system and methodology for sharing data between a plurality of users in an online group on a communications system according to another embodiment of the disclosure.

Referring to FIG. 4, according to another embodiment of the invention, a method 200 is depicted which expands on the method 100 (depicted in FIG. 2). Steps 204-212 are directed to categorizing activities that can happen before step 104 of the method 100 of FIG. 2, that is, before receiving data from a plurality of users. The method 200 is directed to dopple-gangs as discussed below. An embodiment of a system 300 for supporting the method 200 is shown in FIG. 5. The system 300 shown in FIG. 5 may have similarities to the system 10 shown in FIG. 1, and the systems may be used in concert with one another or in other combinations. The system 300 includes additional elements and modules directed to a service embodiment of the present disclosure and supports the method 300.

Step 204 includes determining targeted socially mutable dispositions of a population (e.g., behaviors, and attitudes). Step 208 includes identifying human characteristics of a population, which may include height, weight, or age. Step 212 includes clustering the population into a maximum number of exclusive groups closely matched on human characteristics (e.g., homophilous groups or closely matched groups). Step 216 includes collecting personal data (i.e., personal characteristics or personal characteristics data) pertaining to one or more target dispositions, which may include, for example, a goal such as a goal to lose weight, or visiting a business location every weekday such as a food establishment for lunch. The personal data, for example, referring to step 104 of FIG. 2, can be received from the users, for example, sent by the user, or sent by a sensor proximate or on the user. The personal characteristics can be labeled with times of day and/or locations (e.g., time and location stamps).

Step 220 includes assigning a user to a closely matched group based on a best match to common personal characteristics (also can be referred to as human characteristics) of a group. Step 224 includes segmenting personal characteristic data by a time span and/or a geographic area, and generating aggregate personal characteristic data pertaining to targeted dispositions of the users. For example, ascertaining when a user does a certain activity, and where the activity takes place. Step 228 includes sharing the aggregate personal characteristic data pertaining to the target dispositions with one or more members of the group (e.g., members of the user's assigned homophilous or closely matched group).

Referring to FIG. 5, the system 300 includes a service 310 which is adapted to provide the functions of the method 200 shown in FIG. 4. The service 310 includes a segmenting function 312 for segmenting data, and an aggregate function 314 to aggregate data as in step 224 of the method 200. The service is also adapted to provide a cluster function 316 for clustering a population of users into groups, as in step 212 of the method 200. The service 310 includes an assignment function 318 for assigning users into groups, as in step 220. The service 310 further includes a sharing function 320 for sharing personal data, as in step 229 of the method 200.

A personal device 325 (which is similar to the communications device shown in FIG. 1) can include a display 334, a processor 335, an input device 336, a GPS 332, and a clock 333. A personal device may also be embodied as a personal sensor 340 for detecting data about the person, as discussed above. One or more databases can be used, such as, a first database 360 to store data related to target dispositions (as in step 212 of the method 200) and personal characteristic data (as in step 228 of the method 200). A second database 370 can store personal data such as user's personal data or characteristics (as in steps 216, 220, and 224 of the method 200).

Figure 6:
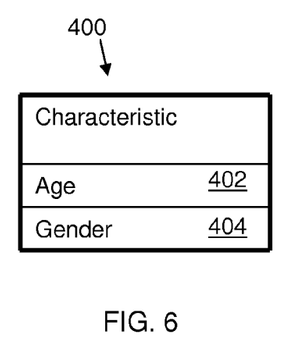
FIG. 6 is a block diagram depicting a chart of characteristics.
Figure 7:
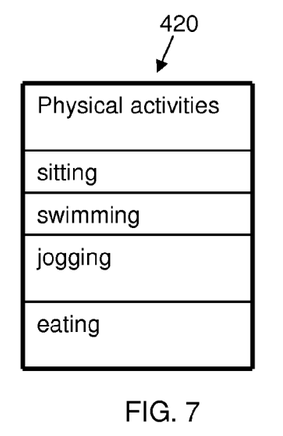
FIG. 7 is a block diagram depicting a chart of physical activities.
Figure 8:
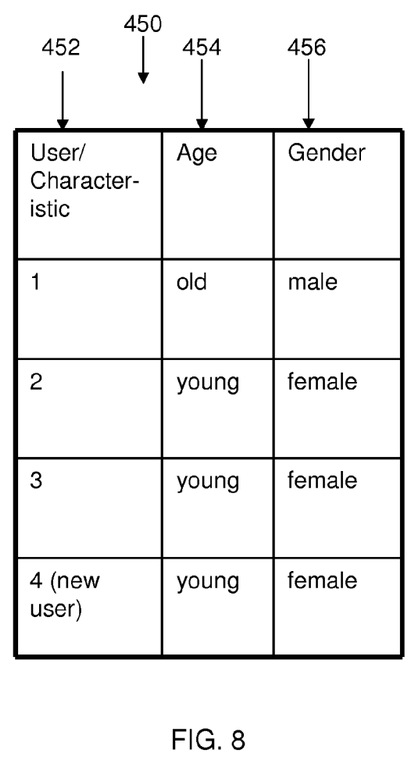
FIG. 8 is a block diagram of a chart depicting user characteristics.
Figure 9:
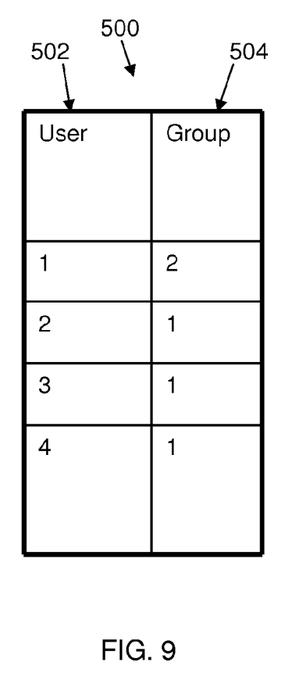
FIG. 9 is a block diagram of a chart of groups for users.

Referring to FIG. 6, a sample characteristics are shown in chart 400 illustrating characteristics for analysis in the method 200 includes age 402 and gender 404. Similarly a chart 420 illustrated physical activities for a user which include, sitting, swimming, jogging, and eating, as shown in FIG. 7. Another chart 450 illustrates user characteristics 452, ages 454, and gender 456, as shown in FIG. 8. Chart 500 depicts matching a user 502 in a group 504, as shown in FIG. 9.

Figure 10:
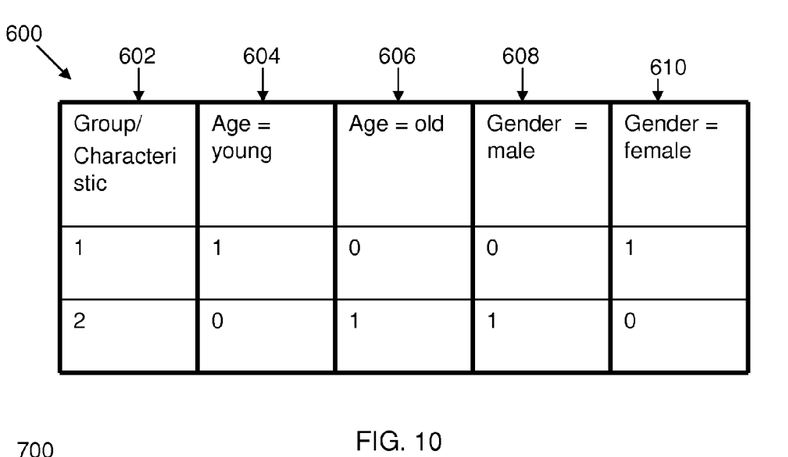
FIG. 10 is a block diagram of a chart of group characteristics.

Referring to FIG. 10, a chart 600 depicts sample group characteristics 602. The groups 1 and 2 have characteristics, age-young 604, age-old 606, gender-male 608, and gender-female 610 labeled with binary "1" or "0" indicating yes or no, respectively.

Figure 11:
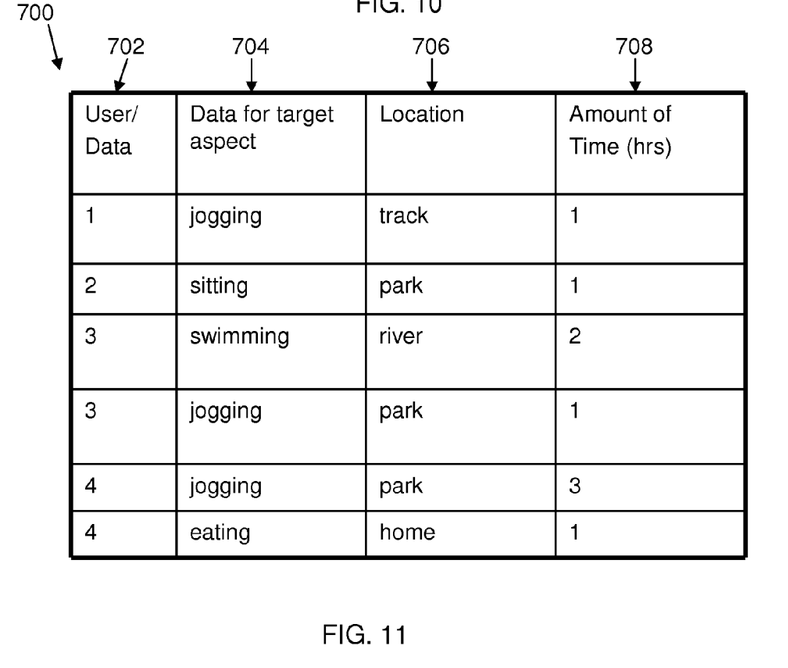
FIG. 11 is a block diagram of a chart of user data.

Referring to FIG. 11, a chart 700 depicts sample user data 702. The target aspects 704 are associated to each of the users, along with a location 706 and an amount of time 708 spent performing the target aspect. For example, GPS (a Global Positioning Satellite) can be used to gather location data (as well as other data) which can be sent to a database for retrieval. The data can be accessed, and alternatively, can be pushed to users who receive, for example, a text message.

Figure 12:
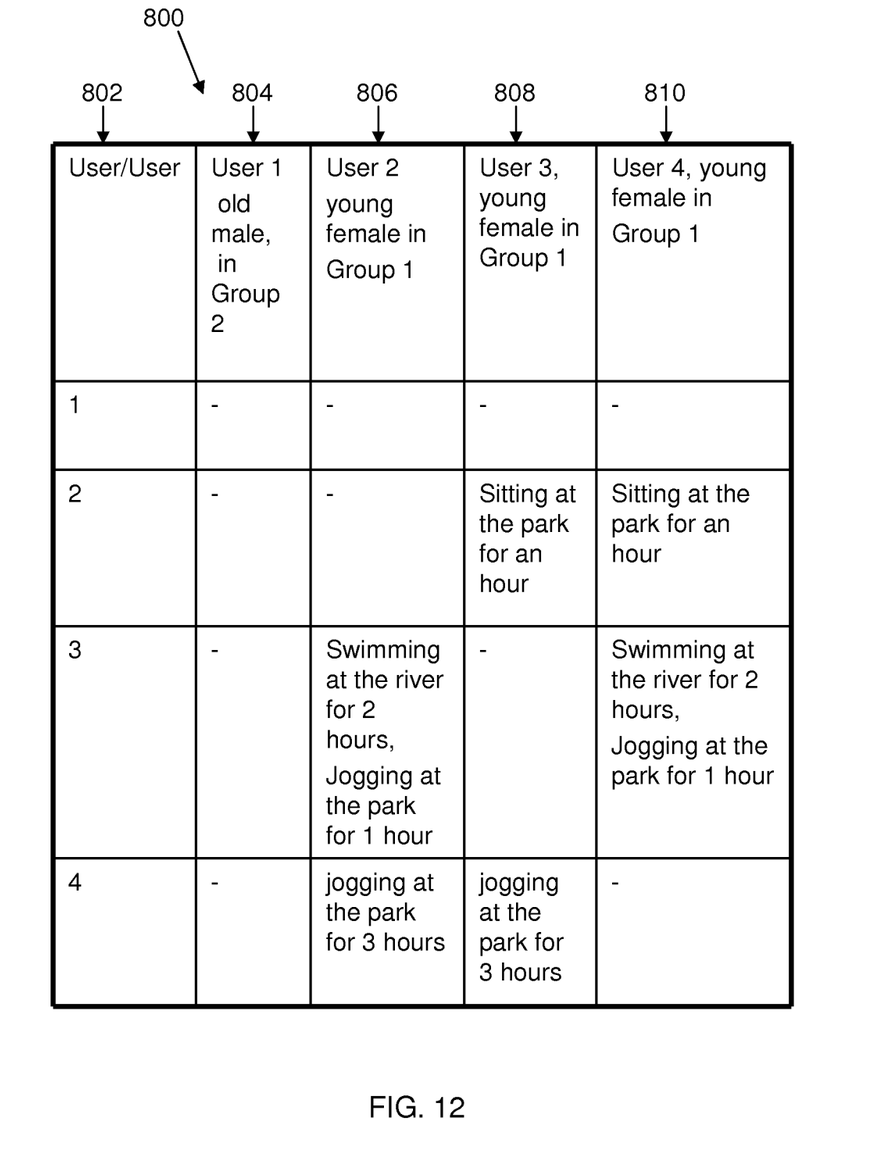
FIG. 12 is a block diagram of a chart of shared user characteristics.
Figure 13:
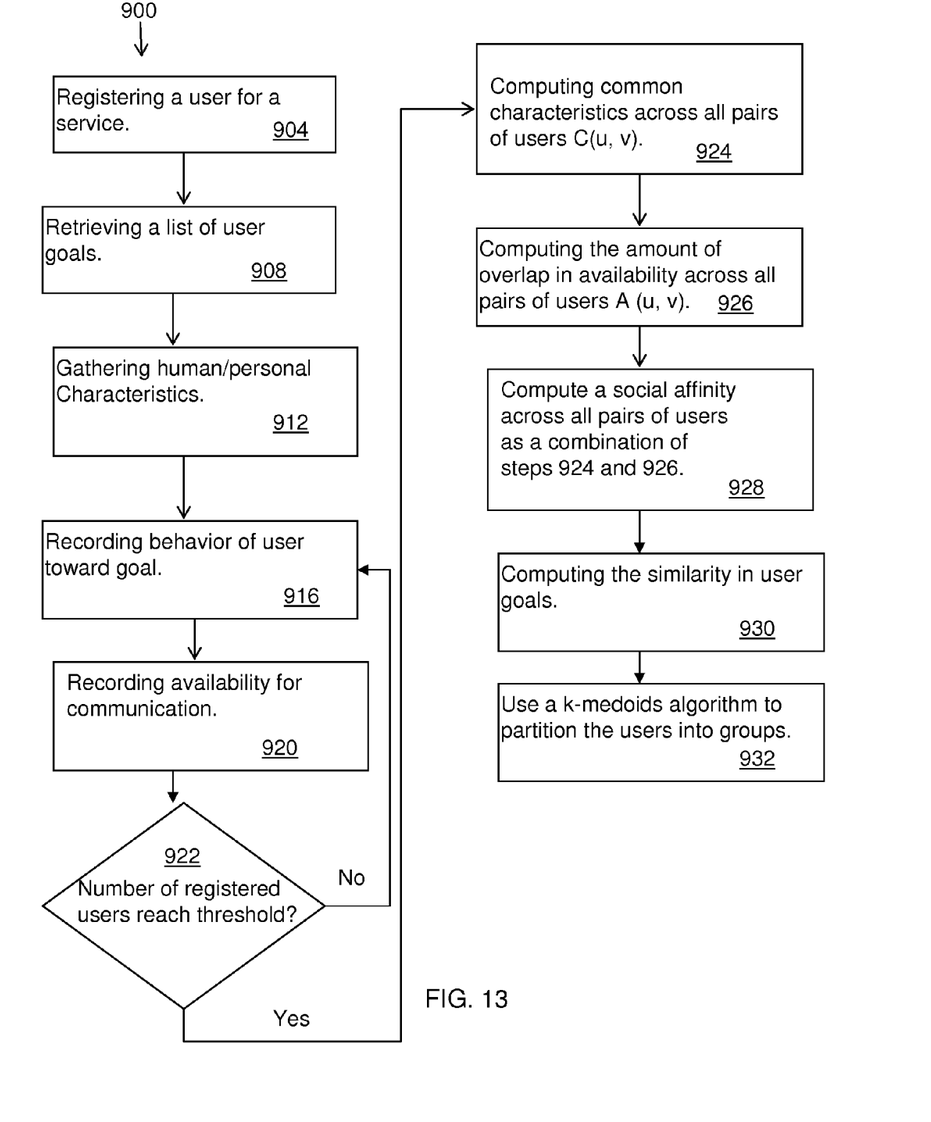
FIG. 13 is a flow chart according to another embodiment of the disclosure directed to a service for sharing data between a plurality of users.

Referring to FIG. 12, a sample aggregate personnel characteristic data chart 800 depicts users 802 target dispositions 804. 806, 808, and 810. In this example, user 3 can notice that user 43 is jogging two hours longer than she is. In another example, user 2 notices that user 4 also goes to the park, but notices user 4 does a more desired behavior.

Thereby, one advantage of the present disclosure is that a closely matched group of people/users includes people of similar personal characteristics, e.g., backgrounds, goals, economic environment, or age. The closely matched group can encourage behavior changes for the users of the group.

One example, of grouping users with similar personal characteristics includes, a group of the United States population including at least 10 million people that are at high risk for type 2 diabetes. In this example, 0.5% of this population, that is, 50,000 people, may be interested in addressing this risk. Thus, the group of people interested in addressing their diabetes risk may be about 50,000. This group can be divided, by the use of analytics, into groups that are matched on a variety of dimensions. One such group might be all non-retired professional men from 50-55 years of age who are no more than 15 pounds over their ideal weight. Another group might be retired women over 65 that are 50 or more pounds over their ideal weight. A third group might be single parents with children at home and whose income is within 15% of the poverty line.

The groups above can be further divided into sub-groups, based on, for example, (1) having at least a superficial similarity; (2) having a group large enough to have a critical mass for online participation; and qualifying the group such that (3) the group is not too large as to overwhelm group members with information and interaction. Conditions 2 and 3 may co-vary with individual, demographic and socio-economic characteristics of individuals. Sub-groups established to meet the above variables may be referred to as dopple-gangs.

The ability to construct dopple-gangs is important in supporting behavior change for at least two reasons. One reason is homophily, that is, the tendency of individuals to associate with, bond with, and be influenced by those they perceive as being similar to themselves. Such individuals will be more willing to offer advice and support to one another. The second reason dopple-gangs are important in supporting behavior change is that a group of closely-matched individuals will be better able to support and advise one another because of the similarity of their experiences. Behavioral change involves addressing behavioral triggers and routines that are bound into the details of an individual's daily life, and those whose lives are most similar will be able to understand one another best, and offer observations and advice that are most relevant.

When an online population has been divided into dopple-gangs, many techniques for grouping can be applied with greater precision and success. These include providing conversational forums where encouragement, advice and other forms of support can be exchanged among members, the establishment of competitions and contests among members, and the commitment of some or all group members to achieving goals. These and other techniques are rendered more effective by the similarity of the members of the dopple-gang.

Referring to FIG. 6, a method 900 for sharing data between users, according to an embodiment of the disclosure, uses a service. The steps may be similar to the methods 100 and 200 shown in FIGS. 2 and 4, and can be read in conjunction with systems 10 and 300 of FIGS. 1 and 5. Step 904 includes registering a user for a service. Step 908 includes retrieving a list of user goals. Step 912 includes gathering human/personal characteristics. Step 916 includes recording behavior of a user toward a goal. Step 920 includes recording availability for communication. In step 922 if the number of registered users does not reach a threshold number, the method return to step 916 to record behavior of more users. If the number of registered users reaches a threshold number, the method proceeds to step 924. Step 924 includes computing common characteristics across all pairs of users C(u, v). Step 926 includes computing the amount of overlap in availability across all pairs of users A (u, v). Step 928 includes computing a social affinity across all pairs of users as a combination of C(u,v) and A(u, v) SA (u, v)=d. C(u,v)+f*A(u,v) where d and f are constants. Step 930 includes computing the similarity in user goals as G(u,v). Step 932 includes using a k-medoids algorithm to partition the users into groups.

The most common realization of k-medoid clustering is the Partitioning Around Medoids (PAM) algorithm and is as follows:

Initialize: randomly select k of the n data points as the medoids

Assignment step: Associate each data point to the closest medoid.

Update step: For each medoid m and each data point o associated to m swap m and o and compute the total cost of the configuration (that is, the average dissimilarity of o to all the data points associated to m). Select the medoid o with the lowest cost of the configuration.

Repeat alternating steps 2 and 3 until there is no change in the assignments.

Part of the algorithm is computing an overall cost of the configuration. This is done by totaling the cost of each pair of users u and v as a cost function C(u,v) as follows:

$$C(u,v)=a*G(u,v)+b*SA(u,v)$$

Where a and b are constants

While embodiments of the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

Therefore, one or more Figures described herein may illustrate a schematic of an embodiment of the disclosure and may include a representative computer system or processing system that may implement a method and a program in one or more embodiments of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with one or more processing systems in the present disclosure may include, but are not limited to, personal computer systems, server computer systems, handheld or laptop devices, multiprocessor systems, microprocessor-based systems, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units, a system memory, and a bus that couples various system components including system memory to processor. Computer system may include a variety of computer system readable media. Such media may be any available media that is accessible by computer system, and it may include both volatile and non-volatile media, removable and non-removable media. System memory 58, shown in FIG. 1, can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices such as a keyboard, a pointing device, a display, etc.; one or more devices that enable a user to interact with computer system; and/or any devices (e.g., network card, modem, etc.) that enable computer system to communicate with one or more other computing devices. Such communication can occur via Input/Output (I/O) interfaces. Additionally, computer systems can communicate with one or more networks such as a local area network (LAN), a general wide area network (WAN), and/or a public network (e.g., the Internet) via network adapter. As depicted, network adapter communicates with the other components of computer system via bus. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

Additionally, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Further, any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams as may be illustrated in the one or more Figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments, features, and instructive examples described above are illustrative, and should not be construed to limit the present disclosure to the particular embodiments or enumerated examples. Thus, various changes and modifications may be effected by one skilled in the art without departing from the spirit or scope of the disclosure as defined in the appended claims.

What is claimed is:

1. A method for sharing data between a plurality of users in an online group on a communications system, comprising the steps of:
   receiving data, using a computer, from a plurality of users communicating on a communications system, the data including personal characteristics about the users, the personal characteristics including one or more of: an interest, an occupation, a marital status, an age, an education level, an experience area, and a goal;
   segmenting the personal characteristics and generating aggregate personal characteristic data pertaining to targeted dispositions of users;
   analyzing the personal characteristics to determine a plurality of groups of personal characteristics, using the computer;
   recording availability of the users for communication and computing overlap of the availability for the users;
   clustering the users into closely matched groups respective to the groups of personal characteristics, the users being clustered into a maximum number of the closely matched groups;
   after the recording of availability of the users and the clustering of the users into closely matched groups, generating a plurality of activity information about each of the users in the closely matched groups, respectively, the activity information including one or more of: a physical activity, a location, and a time of day;
   next, allowing access to the users in each of the closely matched groups to the activity information about other users in each of the closely matched groups, respectively, using the computer;
   recording behavior of the users toward respective goals and computing common characteristics for the users;
   computing a social affinity for a group of users of the users based on the common characteristics and the overlap of availability of the users;
   generating a projected success rate of a behavioral change for each of the closely matched groups and the users in the groups, respectively, based on an analysis of the activity information; and
   generating a suggested activity change to achieve a behavioral change for a closely match group and the users of the closely matched group based on an analysis of the activity information.

2. The method of claim 1, wherein the users access the activity information using a user interface.

3. The method of claim 1, wherein the plurality of activity information includes a first type of information or a second type of information, or a combination of the first and second types of information, as selected by the user.

4. The method of claim 1, wherein the goals include one or more patterns of human activity, which includes: a repeated physical activity.

5. The method of claim 1, wherein the data about the user is supplied by the user using an input device.

6. The method of claim 1, wherein the data about the user is from a sensor, the data including time and location stamps.

7. A computer program product for sharing data between a plurality of users in an online group on a communications system, the computer program product comprising a non-transitory computer readable storage medium having program code embodied therewith, the program code being readable/executable by a processor to perform a method, comprising:
   receiving data from a plurality of users communicating on a communications system, the data including personal characteristics about the users, the personal characteristics including one or more of: an interest, an occupation, a marital status, an age, an education level, an experience area, and a goal;

segmenting the personal characteristics and generating aggregate personal characteristic data pertaining to targeted dispositions of users;

analyzing the personal characteristics to determine a plurality of groups of personal characteristics;

recording availability of the users for communication and computing overlap of the availability for the users;

clustering the users into closely matched groups respective to the groups of personal characteristics, the users being clustered into a maximum number of the closely matched groups;

after the recording of availability of the users and the clustering of the users into closely matched groups, generating a plurality of activity information about each of the users in the closely matched groups, respectively, the activity information including one or more of: a physical activity, a location, and a time of day;

next, allowing access to the users in each of the closely matched groups to the activity information about other users in each of the closely matched groups, respectively, recording behavior of the users toward respective goals and computing common characteristics for the users;

computing a social affinity for a group of users of the users based on the common characteristics and the overlap of availability of the users;

generating a projected success rate of a behavioral change for each of the closely matched groups and the users in the groups, respectively, based on an analysis of the activity information; and generating a suggested activity change to achieve a behavioral change for a closely match group and the users of the closely matched group based on an analysis of the activity information.

8. The computer program product of claim 7, wherein the plurality of activity information includes a first type of information or a second type of information, or a combination of the first and second types of information, as selected by the user.

9. A system for sharing data between a plurality of users in an online group on a communications system, comprising:
a computer system comprising a computer processor, a computer-readable storage medium, and program instructions stored on the computer-readable storage medium for execution by the processor, the computer system comprising:
a communications module of the program instructions being configured to receive data from a plurality of users communicating on a communications system, the data including personal characteristics about the users, the personal characteristics including one or more of: an interest, an occupation, a marital status, an age, an education level, an experience area, and a goal;

an analysis module of the program instructions of the computer system being configured to analyze the personal characteristics to determine a plurality of groups of personal characteristics, the computer system being configured to clusters the users into closely matched groups respective to the groups of personal characteristics, the users being clustered into a maximum number of the closely matched groups, the analysis module being configured to segment the personal characteristics and generate aggregate personal characteristic data pertaining to targeted dispositions of users, and record availability of the users for communication and compute overlap of the availability for the users;

after the recording of availability of the users and the clustering of the users into closely matched groups, the analysis module of the program instructions being configured to generate a plurality of activity information about each of the users in the closely matched groups, respectively, the activity information including one or more of: a physical activity, a location, and a time of day; and the communications module further being configured to allow access to the users in each of the closely matched groups to the activity information about other users in each of the closely matched groups, respectively, subsequent to generating of a plurality of activity information about each of the users in the closely matched groups;

the analysis module further being configured to:
record behavior of the users toward respective goals and compute common characteristics for the users;
compute a social affinity for a group of users of the users based on the common characteristics and the overlap of availability of the users;

the analysis module further being configured to generate a projected success rate of a behavioral change for each of the closely matched groups and the users in the groups, respectively, based on an analysis of the activity information; and the analysis module further being configured to generate a suggested activity change to achieve a behavioral change for a closely match group and the users of the closely matched group based on an analysis of the activity information.

* * * * *